US009286912B2

(12) United States Patent
Srinivasan et al.

(10) Patent No.: US 9,286,912 B2
(45) Date of Patent: Mar. 15, 2016

(54) METHODS AND APPARATUS FOR IDENTIFYING MEDIA

(71) Applicants: Venugopal Srinivasan, Palm Harbor, FL (US); Alexander Topchy, New Port Richey, FL (US)

(72) Inventors: Venugopal Srinivasan, Palm Harbor, FL (US); Alexander Topchy, New Port Richey, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 726 days.

(21) Appl. No.: 13/627,495

(22) Filed: Sep. 26, 2012

(65) Prior Publication Data

US 2014/0088742 A1 Mar. 27, 2014

(51) Int. Cl.

| | |
|---|---|
| ***G06F 17/00*** | (2006.01) |
| ***G10L 25/54*** | (2013.01) |
| ***H04H 60/39*** | (2008.01) |
| ***H04H 60/58*** | (2008.01) |
| *H04H 60/37* | (2008.01) |
| *G10L 19/018* | (2013.01) |
| *H04H 20/31* | (2008.01) |

(52) U.S. Cl.

CPC .............. *G10L 25/54* (2013.01); *H04H 60/372* (2013.01); *H04H 60/39* (2013.01); *H04H 60/58* (2013.01); *G10L 19/018* (2013.01); *H04H 20/31* (2013.01); *H04H 60/37* (2013.01); *H04H 2201/37* (2013.01); *H04H 2201/50* (2013.01)

(58) Field of Classification Search

None

See application file for complete search history.

(56) References Cited

U.S. PATENT DOCUMENTS

| | | | | |
|---|---|---|---|---|
| 5,481,294 | A | 1/1996 | Thomas et al. | |
| 5,606,609 | A | 2/1997 | Houser et al. | |
| 6,154,571 | A | 11/2000 | Cox et al. | |
| 7,457,962 | B2 | 11/2008 | Moskowitz | |
| 7,978,859 | B2 | 7/2011 | Conrado et al. | |
| 8,023,691 | B2 | 9/2011 | Rodriguez et al. | |
| 2002/0168082 | A1 | 11/2002 | Razdan | |
| 2004/0009763 | A1 | 1/2004 | Stone et al. | |
| 2004/0210922 | A1 | 10/2004 | Peiffer et al. | |
| 2007/0055987 | A1 | 3/2007 | Lu et al. | |
| 2007/0168409 | A1 | 7/2007 | Cheung | |
| 2008/0208851 | A1 | 8/2008 | Briggs et al. | |
| 2009/0049465 | A1 * | 2/2009 | Deng ..................... | H04H 60/31 725/9 |

(Continued)

FOREIGN PATENT DOCUMENTS

WO 95-12278 5/1995

OTHER PUBLICATIONS

International Searching Authority, "International Search Report and Written Opinion of the International Searching Authority," issued in connection with application No. PCT/US2013/059497, mailed on Dec. 19, 2013 (13 pages).

(Continued)

*Primary Examiner* — Fan Tsang
*Assistant Examiner* — David Siegel
(74) *Attorney, Agent, or Firm* — Hanley, Flight & Zimmerman, LLC

(57) ABSTRACT

Methods and apparatus are disclosed for identifying media and, more particularly, to methods and apparatus for decoding identifiers after broadcast. An example method includes a portion of an identifying code from a media signal, determine a partition of the look-up table based on the portion of the identifying code wherein the partition of the look-up table includes reference signatures associated with the portion of the identifying code, and identify the media signal by comparing a signature extracted from the media signal to reference signatures in the partition of the look-up table.

42 Claims, 13 Drawing Sheets

(56) References Cited

U.S. PATENT DOCUMENTS

| | | | | |
|---|---|---|---|---|
| 2009/0070797 | A1 | 3/2009 | Ramaswamy et al. | |
| 2009/0070850 | A1 | 3/2009 | Lee | |
| 2009/0287662 | A1 | 11/2009 | Robson et al. | |
| 2010/0119208 | A1 * | 5/2010 | Davis et al. | 386/83 |
| 2010/0226526 | A1 | 9/2010 | Modro et al. | |

OTHER PUBLICATIONS

IP Australia, Examination Report, issued in connection with Australian Application No. 2013324105, dated Apr. 21, 2015, 3 pages.

* cited by examiner

115

| SOURCE ID (510) | TIMESTAMP (520) | SIGNATURE (530) |
|---|---|---|
| 2356 HBO | 1/1/2011 12:00:00 | 2F56AB |
| 2356 HBO | 1/1/2011 12:00:00 | A284D5 |
| 2356 HBO | 1/1/2011 12:00:00 | E6834D |
| ... | ... | ... |
| 2356 HBO | 10/11/2011 12:43:01 | 9A887B |
| 2356 HBO | 10/11/2011 12:43:01 | 22E570 |
| 2356 HBO | 10/11/2011 12:43:01 | AA9B7F |
| ... | ... | ... |
| 2615 MLB | 3/20/2011 3:52:26 | 7449A0 |
| 2615 MLB | 3/20/2011 3:52:26 | 087BAF |
| 2615 MLB | 3/20/2011 3:52:27 | A54CDE |
| ... | ... | ... |
| 2615 MLB | 7/12/2011 5:07:12 | 2F56AB |
| 2615 MLB | 7/12/2011 5:07:12 | 89743D |
| 2615 MLB | 7/12/2011 5:07:12 | 6845D4 |
| ... | ... | ... |

FIG. 5

METHODS AND APPARATUS FOR IDENTIFYING MEDIA

FIELD OF THE DISCLOSURE

This disclosure relates generally to media, and, more particularly, to methods and apparatus for identifying media.

BACKGROUND

Media identification systems utilize a variety of techniques to identify media (e.g., television (TV) programs, radio programs, advertisements, commentary, audio/video content, movies, commercials, advertisements, web pages, and/or surveys, etc.). In some media identification systems, a code is inserted into the audio and/or video of a media program. The code is later detected at one or more monitoring sites when the media program is presented. An information payload of a code inserted into media can include unique media identification information, source identification information, time of broadcast information, and/or any other identifying information.

Media identification systems may additionally or alternatively generate signatures at one or more monitoring sites from some aspect of media (e.g., the audio and/or the video). A signature is a representation of a characteristic of the media (e.g., the audio and/or the video) that uniquely or semi-uniquely identifies the media or a part thereof. For example, a signature may be computed by analyzing blocks of audio samples for their spectral energy distribution and determining a signature that characterizes the energy distribution of selected frequency bands of the blocks of audio samples. Signatures generated from media to be identified at a monitoring site are compared against a reference database of signatures previously generated from known media to identify the media.

Monitoring sites include locations such as, households, stores, places of business and/or any other public and/or private facilities where media exposure and/or consumption of media on a media presentation device is monitored. For example, at a monitoring site, a code from audio and/or video is captured and/or a signature is generated. The collected code and/or generated signature may then be analyzed and/or sent to a central data collection facility for analysis. In some systems, the central data collection facility or another network component may also send secondary media (e.g., secondary media associated with the monitored media) to the monitoring site for presentation on a media presentation device. For example, the secondary media may be an advertisement associated with a product displayed in the monitored media.

BRIEF DESCRIPTION OF THE DRAWINGS

FIG. 5 is an example look-up table which may be used in conjunction with the example system of FIG. 1.

DETAILED DESCRIPTION

Figure 1:
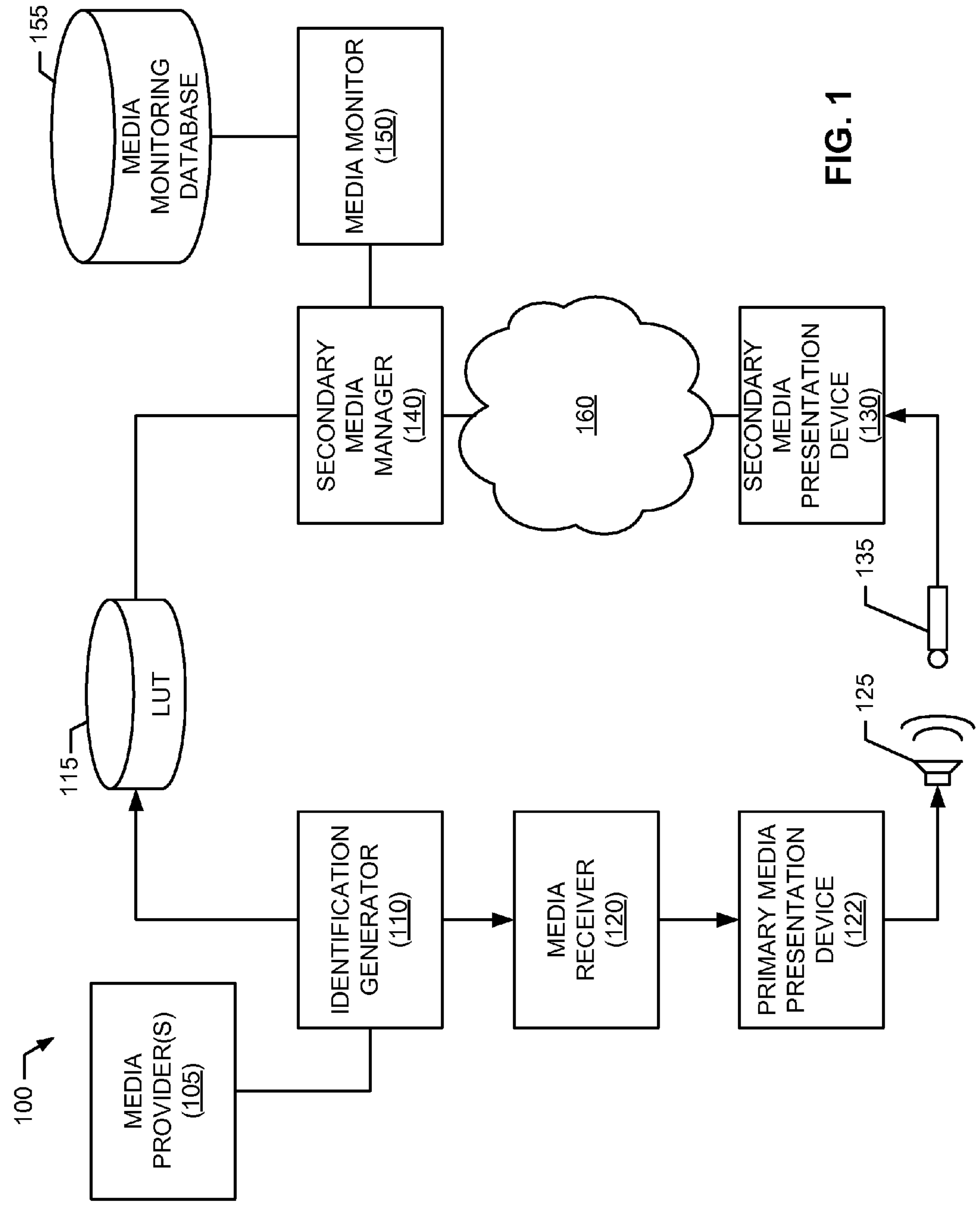
FIG. 1 is a block diagram of an example system for identifying primary media and providing secondary media associated with the primary media.

Audio watermarks may be embedded at a constant rate in an audio signal (e.g., every 4.6 seconds). In some instances, when the audio signal is received and decoding of the watermark is attempted, less than all of the watermarks may be detected (e.g., watermarks might only be detected approximately every 30 seconds due to interference, noise, etc.). For example, presented audio that is detected by a microphone and then decoded is particularly susceptible to interference and noise. Furthermore, the payload of a watermark may not be decoded completely. For example, a timestamp of a payload may only be partially accessible (e.g., the seconds value of the timestamp may be unreadable due to noise and/or due to techniques that stack or combine several watermarks over a period of time to increase detection accuracy). In contrast, signatures captured from media can typically be more reliably compared with reference signatures to identify the media. However, such comparison is often computationally intensive due to the number of reference signatures for comparison.

Methods and apparatus described herein utilize the partial data obtained from watermarks to reduce the search space of the reference signatures. Accordingly, an obtained signature can be compared with the reference signatures in the reduced search space to identify a match resulting in reduced computation complexity and a reduced likelihood that a signature will be incorrectly matched. As described in further detail herein, the partial data from the watermark can be used to filter out reference signatures that are associated with media that does not match the partial data. For example, a watermark may indicate a source identifier of 1234 and a timestamp of 13:44:??, where the ?? indicates that the seconds are unknown. As described herein, the reference signatures that are not associated with source identifier 1234 and are not in the time range 13:44:00 to 13:44:59 can be eliminated from the list of reference signatures against which a collected signature is compared (e.g., where the signature is collected near the same time as the watermark). Accordingly, even when a watermark is not always detected and/or a watermark is partially detected, presented media content can be efficiently identified. Such efficiency may result in savings of computing resources and computing time for identifying media by matching signatures because the reduced size of the partition reduces the search space utilized to match signatures.

The disclosed methods and apparatus may additionally or alternatively facilitate more accurate identification of media. In some instances the same media may be presented multiple times and/or on multiple stations. Accordingly, the same sequence of signatures may be found at multiple times and on multiple different stations. Accordingly, signatures alone may not uniquely identify a specific instance of media that was presented. Reducing the search space of the signatures using all or part of extracted watermarks, as disclosed herein, reduces the likelihood that a sequence of signatures will match multiple instances of media presentation or will match an incorrect instance of media presentation. For example, if only a source identifier can be extracted from a watermark, the source identifier can limit the signature search to media distributed the identified source and, thus, a sequence of signatures will not be incorrectly matched to media from another source. In another example, if a partial timestamp is extracted from the watermark, the partial timestamp can limit the signature search to media presented during the time period associated with the partial timestamp and, thus, a sequence of signatures will not be incorrectly matched A disclosed example method includes receiving a media signal from a media presentation device, determining at least a portion of an identifying code from the media signal, generating a signature from the media signal, determining a partition of a look-up table of reference signatures wherein the partition includes reference signatures associated with the portion of the identifying code, and identifying the media signal by comparing the generated signature with the reference signatures in the partition of the look-up table. In some such examples, the look-up table contains timestamps and signatures from the reference media signal wherein the signatures are associated with the timestamps. In some examples, the partition of the look-up table is determined by decreasing the search space of the reference signature look-up table.

In some examples, the portion of the identifying code is a timestamp. In such examples, the partition of the look-up table may be determined by determining a time range within the look-up table based on the timestamp and selecting entries for inclusion in the partition of the look-up table which include timestamps within the time range. Additionally, when a portion of the timestamp is unreadable or otherwise unavailable, the partition of the look-up table may be determined by determining an approximate timestamp from the available or readable portion of the timestamp, determining a time range within the look-up table based on the timestamp and selecting entries for inclusion in the partition of the look-up table which include timestamps within the time range.

In some examples, the portion of the identifying code is source identification data. In such examples, the partition of the look-up table may be determined by selecting entries that include the source identification information for inclusion in the partition of the look-up table.

In some examples, the portion of the identifying code contains source identification data and a timestamp. In such examples, the partition of the look-up table may be determined by determining a time range within the look-up table based on the timestamp and selecting entries for inclusion in the partition of the look-up table which include timestamps within the time range and the source identification information. Additionally, the partition of the look-up table may be determined by determining an approximate timestamp from the readable portion of the timestamp, determining a time range within the look-up table based on the timestamp and selecting entries for inclusion in the partition of the look-up table which include timestamps within the time range and the source identification information.

In some examples, the media signal includes an audio signal. The audio signal may embody speech, music, noise, or any other sound. A code may be encoded within audio as an audio watermark. In some examples of audio watermark encoding, the code is psycho-acoustically masked so that the code is imperceptible to human hearers of the audio. In other examples, the code may be perceived by some or all human listeners. The codes may include and/or be representative of any information such as, for example, a channel identifier, a station identifier, a program identifier, a timestamp, a broadcast identifier, etc. The codes may be of any suitable length. Any suitable technique for mapping information to the codes may be utilized. Furthermore, the codes may be converted into symbols that are represented by signals. For example, the codes or symbols representative of the codes may be embedded by adjusting (e.g., emphasizing or attenuating) selected frequencies in an audio signal. Any suitable encoding and/or error correcting technique may be used to convert codes into symbols.

FIG. 1 is a block diagram of an example system 100 for identifying primary media, metering the primary media, and providing secondary media associated with the primary media. The example system 100 includes media provider(s) 105, identification generator 110, look-up table (LUT) 115, media receiver 120, primary media presentation device 122, speaker 125, secondary media presentation device 130, microphone 135, secondary media manager 140, media monitor 150, media monitoring database 155, and network 160. The media provider 105 sends a media signal to the identification generator 110. The example identification generator 110 produces identification information (e.g., codes for embedding in the media signal and/or signatures extracted from the media signal), stores the produced identification information as reference media monitoring information in the LUT 115, and sends the media signal to the media receiver 120. The example media receiver 120 sends the media signal to the primary media presentation device 122 which presents an audio portion of the media signal via the speaker 125. The secondary media presentation device 130 receives the audio portion of the media signal via the microphone 135. The secondary media presentation device 130 then determines identification information from the audio portion of the media signal (e.g., by extracting identifying codes and/or generating identifying signatures) and sends the identifying information to the secondary media manager 140 as identifying media monitoring information. The secondary media manager 140 then compares the identifying media monitoring information to the reference media monitoring information stored in the LUT 115 to find matching media monitoring information. The example secondary media manager 140 sends the matching media monitoring information to the media monitor 150, and optionally provides secondary media to the secondary media presentation device 130 based on the matching media monitoring information. The example media monitor 150 stores the matching media monitoring information in the media monitoring database 155.

The media provider(s) 105 of the illustrated example distribute media for broadcast. The media provided by the media provider(s) 105 can be any type of media, such as audio content, video content, multimedia content, advertisements, etc. Additionally, the media can be live media, stored media, etc.

The identification generator 110 of the illustrated example receives a media signal from the media provider 105, generates identifying information associated with the media signal, stores the identifying information in the LUT 115 as reference media monitoring information, encodes identifying information within the media signal, and sends the encoded media signal to the media receiver 120. The identification generator 110 of the illustrated example generates a signature from the media signal and inserts an identifying code into the signal. The generated signature is stored in the LUT 115. While a single identification generator 110 is illustrated in FIG. 1, the identification generator 110 may be implemented by separate components, wherein a first component generates the signature and a second component inserts the identifying code into the signal. For example, the component that generates and inserts the identifying code may be located at a media distributor and the component that generates the signature may be located at a reference site, media monitoring facility, etc. that receives media after the media is broadcast, distributed, etc.; identifies the media; generates the signature; and stores the signature along with identifying information in the LUT 115. An example implementation of the identification generator 110 is illustrated in greater detail in FIG. 2 and described below.

The LUT 115 of the illustrated example is a table that stores reference identifying information associated with media. The LUT 115 of the illustrated example receives identifying information and generated signatures from the media signal processed by the identification generator 110 and stores the information as reference media monitoring information organized by timestamp. The example LUT 115 is a data table stored, for example, on at least one of a database, a hard disk, a storage facility, or a removable media storage device. The LUT 115 receives input from the identification generator 110 to create the data table. The LUT 115 is accessed by the secondary media manager 140 to provide reference data for media identification. The LUT 115 may additionally or alternatively store other identifying information such as, for example, identifying codes associated with media. While a single LUT 115 is illustrated in FIG. 1, multiple LUTs 115 may be utilized and may be maintained by separate databases, datastores on computing devices, etc. For example, separate LUTs 115 may be associated with each media station/channel. Furthermore, each LUT 115 may be implemented as multiple tables such as, for example, a first table sorted by timestamp associating timestamps to signature values and a second table sorted by signature linking signatures to corresponding locations or timestamps in the first table (e.g., a single signature value may be associated with multiple timestamps and/or multiple stations/channels). An example implementation of the LUT 115 is described in conjunction with FIG. 5.

The media receiver 120 of the illustrated example is a device which receives a media signal from the identification generator 110 and presents and/or records the media signal. In some examples, the media receiver 120 is a customer-premises device, a consumer device, and/or a user device that is located, implemented and/or operated in, for example, a house, an apartment, a place of business, a school, a government office, a medical facility, a church, etc. Example media receivers 120 include, but are not limited to, an internal tuner in a consumer electronic device of any type, a set top box (STB), a digital video recorder (DVR), a video cassette recorder (VCR), a DVD player, a CD player, a personal computer (PC), a game console, a radio, an advertising device, an announcement system, and/or any other type(s) of media player.

The primary media presentation device 122 of the illustrated example receives a media signal from the media receiver 120 and presents the media. Example primary media presentation devices 122 include, but are not limited to, an audio system, a television, a computer, a mobile device, a monitor, and/or any other media presentation system. In some examples, the media receiver 120 of FIG. 1 outputs audio and/or video signals via the primary media presentation device 122. For instance, a DVD player may display a movie via a screen and speaker(s) of a TV and/or speaker(s) of an audio system.

The speaker 125 of the illustrated example receives an audio signal from the primary media presentation device 122 and presents the audio signal. Example speakers 125 include, but are not limited to, an internal speaker in a television, a speaker of an audio system, a speaker connected to a media presentation device 122 via a direct line (e.g., speaker wire, component cables, etc.), and/or a speaker connected to a media presentation device 122 via a wireless connection (e.g., Bluetooth, Wi-Fi network, etc.).

The secondary media presentation device 130 of the illustrated example extracts identification information from media and presents media received from the secondary media manager 140 via the network 160. Examples of the secondary media presentation device 140 include, but are not limited to, a desktop computer, a laptop computer, a mobile computing device, a television, a smart phone, a mobile phone, an Apple® iPad®, an Apple® iPhone®, an Apple® iPod®, an Android™ powered computing device, Palm® webOS® computing device, etc. The example secondary media manager 140 includes an interface to extract identification information from an audio signal detected by the microphone 135. In the illustrated example, the secondary media presentation device 140 sends the extracted identification information to the secondary media manager 140 as identifying media monitoring information via the network 160. In some examples, the secondary media presentation device includes one or more executable media players to present secondary media provided by the secondary media manager 140. For example, the media player(s) available to the media presentation device 120 may be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), or any other media player or combination thereof. While a single secondary media presentation device 130 is illustrated in FIG. 1, any number and/or variety of the secondary media presentation devices 130 may be included in the system 100. An example implementation of the secondary media presentation device 130 is described in conjunction with FIG. 3.

The microphone 135 of the illustrated example receives an audio signal from a source (e.g., the speaker 125) and transmits the received audio signal to the secondary media presentation device 130. The microphone 135 may be an internal microphone within the secondary media presentation device 130, a microphone connected directly to the secondary media presentation device 130 via a direct line, and/or a microphone connected to the secondary media presentation device 130 via a wireless connection (e.g., Bluetooth, Wi-Fi network, etc.).

The secondary media manager 140 of the illustrated example receives the identifying media monitoring information from the secondary media presentation device 130 via the network 160 and identifies the media by comparing the identifying media monitoring information with reference media monitoring information stored within the LUT 115. In some examples in which the media monitoring information includes an identifying code and a signature, the identifying code may only be partially readable and/or sparsely detected. In such examples, the secondary media manager 140 will estimate a code value based on the readable portion of the code and determine a time range from the estimated code value. For example, the readable portion of the identifying code may be missing the seconds value of the timestamp (e.g. 18:21:??). In such examples, the secondary media manager 140 may estimate a time range of all timestamps including the readable hours and minutes portions of the timestamp (e.g. the time range determined from a partial timestamp of 18:21:?? is 18:21:00 to 18:21:59). Similarly, the secondary media manager 140 may estimate a code value based on a previously retrieved code. For example, if a code having the timestamp 14:11:45 was the last code retrieved, the secondary media manager 140 may estimate a time range of all timestamps to be 18:21:00 to 18:22:59 to account for a signature having been collected in the time range.

Using the determined time range, the secondary media manager 140 creates a partition of the reference LUT 115 including reference signatures having a timestamp within the time range. To determine a matching reference signature, the secondary media manager 140 compares the reference signatures contained in the partition of the LUT 115 with the signature associated with the identifying media monitoring information. The LUT 115 may be further partitioned based on a source identifier (e.g., a table corresponding to the source identifier may be selected). Previously received signatures may also be compared (e.g., where individual signatures are not globally unique a sequence or neighborhood of signatures may be utilized to uniquely identify media).

Once a matching signature is found, the secondary media manager 140 will report the identifying information associated with the matching signature as matching media monitoring information to the media monitor 150. Accordingly, the secondary media manager 140 can efficiently identify media content when the code is not fully recovered and/or when not all codes are recovered (e.g., each consecutively embedded code is not successfully recovered).

The example secondary media manager 140 selects secondary media associated with the matching media monitoring information from an internal or external database and sends the secondary media to the secondary media presentation device 130. Example secondary media includes, but is not limited to videos, commercials, advertisements, audio, games, web pages, advertisements and/or surveys. For example, the secondary media presentation device 140 may be a tablet computer connected to the Internet. In such an example, when the user of the secondary media presentation device 140 is watching a television program (example media) and an embedded microphone (e.g. microphone 135) of the secondary media presentation device 130 receives the audio portion of the television program, the secondary media presentation device 130 processes the audio for identification information, sends the identification information to the secondary media manager 140, and receives secondary media associated with the television program. An example implementation of the secondary media manager 140 is described in conjunction with FIG. 4.

The media monitor 150 of the illustrated example receives matching media monitoring information from the secondary media manager 140 and stores the matching media monitoring information in the media monitoring database 155. The example media monitor 150 generates reports based on the media monitoring information. For example, the media monitor 150 may report the number of times that the media has been presented. Additionally or alternatively, the media monitor 150 may generate any other report(s).

The media monitoring database 155 of the illustrated example is a database of media monitoring information stored, for example, on at least one of a database, a hard disk, a storage facility, or a removable media storage device. The media monitoring database 155 receives input from the media monitor 150 to create a database of media monitoring information. For example, the media monitor 150 may track media exposure of statistically selected individuals (panelists) and use the data to produce media exposure statistics The network 160 of the illustrated example is the Internet. Additionally or alternatively, any other network(s) linking the secondary media presentation device 130 and the secondary media manager 140 may be used. The network 160 may comprise any number of public and/or private networks using any type(s) of networking protocol(s).

While FIG. 1 illustrates one example system 100 for identifying primary media and providing secondary media associated with the primary media, other example methods, systems, and apparatus to provide secondary media associated with primary media are described in U.S. patent application Ser. No. 12/771,640, entitled "Methods, Apparatus and Articles of Manufacture to Provide Secondary Content in Association with Primary Broadcast Media Content," and filed Apr. 30, 2010, which is hereby incorporated by reference in its entirety.

Figure 2:
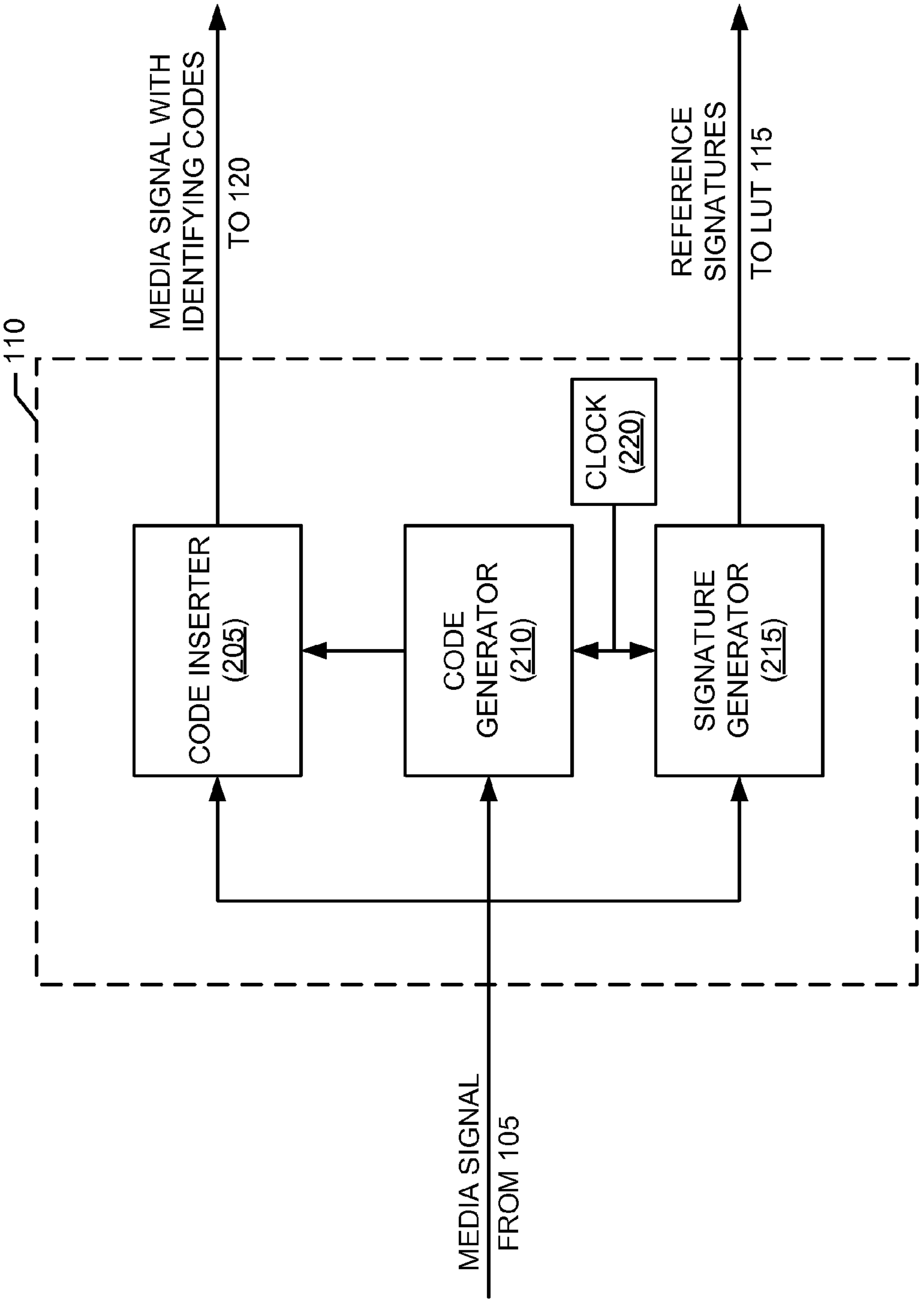
FIG. 2 is an example block diagram of the identification generator of FIG. 1.

FIG. 2 is a block diagram of an example implementation of the identification generator 110 of FIG. 1. To generate reference media monitoring information, the identification generator 110 includes a code generator 210, a signature generator 215, and a clock 220. To insert the codes into the media signal provided by media provider(s) 105, the identification generator 110 also includes a code inserter 205.

The code generator 210 of the illustrated example generates identifying codes for the media signal, which are inserted into the media signal by the code inserter 205. The identifying codes may additionally or alternatively be stored in a reference data store (e.g., the LUT 115). Example identifying codes may include a timestamp, source identification data, media identification data, or any other data associated with the media signal. The code generator 210 may receive information to facilitate the generation of the codes from the clock 220, one or more external input(s), a configuration file, preexisting codes already encoded in the media signal, or any other data source. The example code generator 210 creates codes which are embedded as an audio watermark within an audio portion of the media signal by the code inserter 205. In some examples, such identifying code systems include the Nielsen Watermarks codes (a.k.a. Nielsen codes) of The Nielsen Company (US), LLC. Other example identifying codes include, but are not limited to, codes associated with the Arbitron audio encoding system. Any other types of codes may additionally or alternatively be used.

The signature generator 215 of the illustrated example generates signatures from the media signal and stores the signatures as reference signatures within the LUT 115. The example signature extractor 215 is configured to receive the media signal and generate signatures representative of the media signal. In the illustrated example, the signature generator 215 generates signatures using the audio portion of a media signal. However, signature generator 215 may use any suitable method to generate a signature and/or multiple signatures from the audio and/or video. For example, a signature may be generated using luminance values associated with video segments, one or more audio characteristics of the media, etc. The example signature generator 215 generates and stores packets of signatures for each timestamp (e.g., 60 signatures per second). Alternatively, any other signature timing may be utilized. While the example signature generator 215 is illustrated near the code generator 210 in FIG. 2, the example signature generator 215 is physically located away from the code generator 210 at a reference site, media monitoring facility, etc. that receives the media signal after the media signal has been broadcast. For example, the signature generator 215 may include the signal receiver 120 to receive the media signal from the media providers 105.

The clock 220 of the illustrated example provides timing data and correlates the reference codes and reference signatures associated with a particular part of a media signal. In some examples, the clock 220 creates a timestamp to be used in the identifying codes and associates the codes with reference signatures to form the LUT 115. In some examples, the media signal may contain a pre-existing code including a timestamp and the clock 220 is not needed.

The code inserter 205 of the illustrated example inserts the identifying codes generated by the code generator 210 into the media signal provided by the media provider(s) 105. The example code inserter 205 receives a media signal from the media provider 105 and identifying codes associated with the media signal from the code generator 210. The code inserter 205 inserts the code into the media signal using any form of insertion or encoding. For example, if the identifying code generated by code generator 210 is a Nielsen Watermark code (i.e., a proprietary code of The Nielsen Company (US), LLC), the identifying code will be encoded in an audio portion of the media signal as an audio watermark. The media signal including identifying codes is transmitted to one or more media providers for broadcast. For example, according to the example of FIG. 1, the media signal is transmitted to the media receiver 120.

Figure 3:
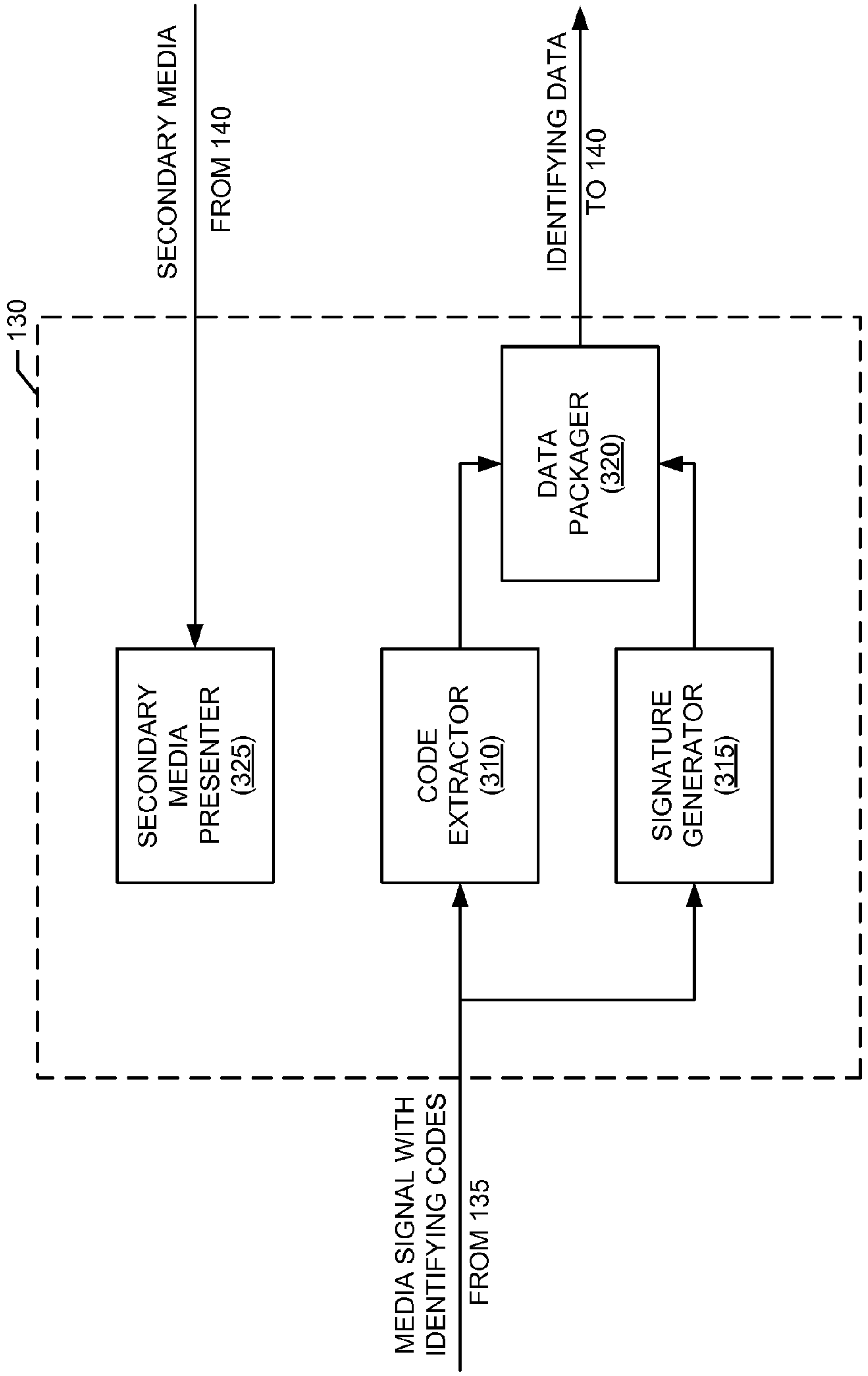
FIG. 3 is an example block diagram of the secondary media presentation device of FIG. 1.

FIG. 3 is block diagram of an example implementation of the secondary media presentation device 130 of FIG. 1. To extract and/or generate identifying data from a media signal that includes identifying codes received by the microphone 135, the secondary media presentation device 130 includes a code extractor 310, a signature generator 315, and a data packager 320. To receive secondary media from a secondary media manager 140, the example secondary media presentation device 130 includes a secondary media presenter 325.

The code extractor 310 of the illustrated example receives a media signal that includes identifying codes from the microphone 135 and extracts a portion of the identifying codes. Code extractor 310 may extract a complete code, may extract a partial code, or may extract an incomplete code. For example, a partial code or incomplete code may be extracted due to ambient noise that prevents extraction of a complete code. The extracted code may contain a timestamp, a portion of a timestamp, source identification data, unique media identification data, and/or any other complete or partial information. Some examples of identifying codes extracted by the code extractor 310 include a code containing a timestamp and source identification data (see FIG. 6 and description below), a code containing an incomplete timestamp and source identification data (see FIG. 7 and description below), a code containing an unreadable or otherwise unavailable timestamp and complete source identification data (see FIG. 8 and description below), and/or a code containing an incomplete timestamp and unreadable or otherwise unavailable source identification data (see FIG. 9 and description below). The extracted code or portion thereof is sent from the code extractor 310 to the data packager 320

The signature generator 315 of the illustrated example receives the media signal with identifying codes from the microphone and generates signature(s) from the media signal. In some examples, the signatures are generated from the same portion of the media signal from which the code extractor 310 extracts a portion of the identifying codes. The signature generator 315 sends the generated signature to the data packager 320.

The data packager 320 of the illustrated example packages the identifying code(s) and/or portions of the identifying code(s) extracted by the code extractor 310 and the signature(s) generated by the signature generator 315 into a data package for transmission as identifying media metering information. The data package may be sent as one complete package, as separate packages, or any other suitable way to send data to the secondary media manager 140. The data package may take any form that may be communicated to the secondary media manager 140 via the network 160 (e.g. a text stream, a data stream, etc.).

The secondary media presenter 325 of the illustrated example displays secondary media provided to the secondary media presentation device 130 by a secondary media manager 140. For example, the secondary media presenter 325 available to the secondary media presentation device 130 may be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof. While a secondary media presenter 325 is illustrated in FIG. 3, any number and/or variety of media presentation devices may be included in the secondary media presentation device 130.

Figure 4:
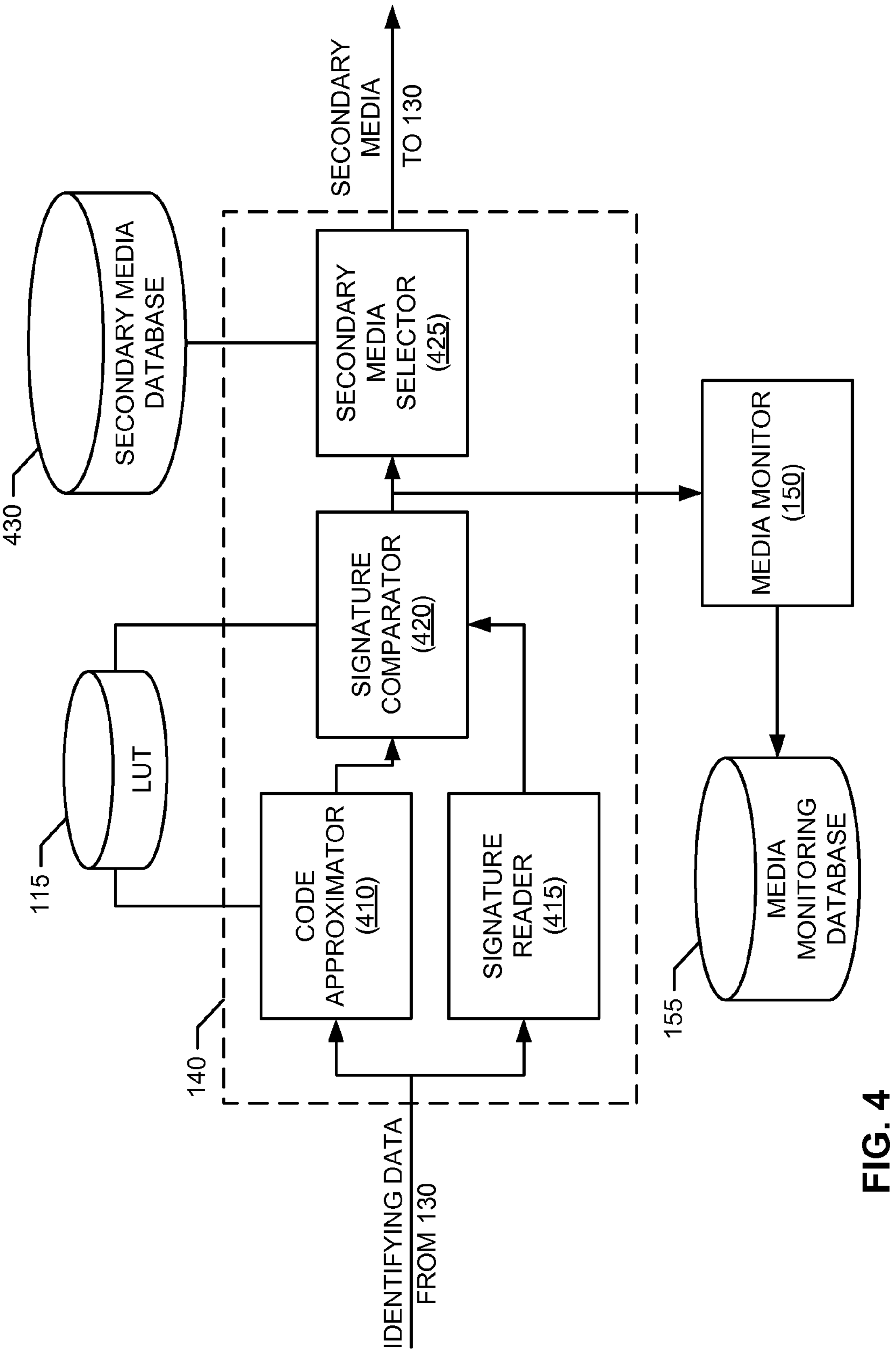
FIG. 4 is an example block diagram of the secondary media manager of FIG. 1.

FIG. 4 is a block diagram of an example secondary media manager 140 of FIG. 1. To analyze the identifying data received from the secondary media presentation device 130, the secondary media manager 140 of FIG. 4 includes a code approximator 410, a signature reader 415, and a signature comparator 420. To select and transmit secondary media to the secondary media presentation device 130, the secondary media manager includes a secondary media selector 425 and is connected to a secondary media database 430.

The code approximator 410 of the illustrated example determines an approximate identifying code from the portion of the identifying code contained in the identifying media metering information. The portion of the identifying code received may contain complete or incomplete data. The code approximator 410 may additionally or alternatively determine the approximate identifying code based on previously detected codes (e.g., by considering portions of the timestamp of the code to be wildcard (e.g., the seconds or minutes of the timestamp)). The code approximator 410 determines a time range of timestamps based on the approximate identifying code (e.g., based on a partial timestamp included in the code and/or a timestamp having wildcard inserted) and determines a partition of the LUT 115 including entries which include reference signatures having timestamps within the time range. The partition of the LUT 115 and/or a table of the LUT 115 may be selected based on other identifying information (e.g., a source identifier) determined by the code approximator 410. The partition of the LUT 115 is reported to the signature comparator 420.

The signature reader 415 of the illustrated example reads an identifying signature from identifying media metering information received from the secondary media metering device 130. The signature reader 415 transmits the identifying signature value.

The signature comparator 420 of the illustrated example receives an identifying signature from the signature reader 415, receives the partition of the LUT 115 from the code approximator 410 and compares the identifying signature with the reference signatures contained in the partition of the LUT 115. If the signature comparator 420 determines that a signature contained in the LUT 115 matches the identifying signature, then the signature comparator 420 outputs the reference identifying information contained at the location of the matching signature to the media monitor 150 and to the secondary media selector 425 as matching media monitoring information.

The secondary media selector 425 of the illustrated example receives identifying information from the signature comparator 420, selects secondary media from a secondary media database 430 associated with the identifying information, and transmits the secondary media to a secondary media presentation device 130. The secondary media database 430 stores secondary media on, for example, at least one of a database, a hard disk, a storage facility, or a removable media storage device. Example secondary media includes, but is not limited to videos, commercials, advertisements, audio, games, web pages, advertisements and/or surveys. The secondary media database provides secondary media to the secondary media selector 425. The media in the secondary media database 430 may be provided by the media producer, the media distributor, a third party advertiser, or any other source of media. For example, the secondary media selector 420 may receive identifying information associated with a television program from the signature comparator 420. The secondary media selector 425 may retrieve secondary media associated with the television program, created by the media producer, from the secondary media database 430.

In some examples, the secondary media manager 140 may receive additional information associated with the secondary media presentation device 130 in addition to the identifying information. For example, the additional information may include information about applications executing on the secondary media presentation device 130, activities being performed on the secondary media presentation device 130, etc. The secondary media selector 425 may select secondary media based on the identified primary media and the additional information. For example, where a first secondary media presentation device 130 is executing a sports application, the secondary media selector 425 may select sports information associated with a particular primary media (e.g., a television news program) as the secondary media. Similarly, where a second secondary media presentation device 130 is executing a trivia game, the secondary media selector 425 may select trivia information associated with the same particular primary media as the secondary media. In other words, different secondary media may be selected for different secondary media presentation devices 130 detecting presentation of the same primary media content.

An example implementation of the LUT 115 of FIGS. 1 and 4 is illustrated in FIG. 5. The example LUT 115 of FIG. 5 includes three columns: column 510 includes source identification data, column 520 includes timestamp data for reference signatures in column 530. The LUT 115 may contain additional or alternative columns containing any additional information.

The rows of the example LUT 115 of FIG. 5 are sorted first by the reference source identification data in column 510. Alternatively, the LUT 115 may include separate tables partitioned by reference source identification data (e.g., one table for each unique source identifier). Once the example LUT 115 is sorted by column 510, it is further sorted in chronological order by the timestamp data of column 520. The LUT 115 may not be sorted or may be sorted in any other way for faster or more efficient searching or for any other reason. For example, a second table of reference data may be sorted by reference signature where each reference signature is linked to the one or more timestamps at which the reference signature was generated from media.

The data in columns 510, 520 and 530 are input to the example LUT 115 by the identification generator 110 of FIG. 1. Specifically, the data of columns 510, 520, and 530 are input to the example LUT 115 by the signature generator 215 of FIG. 2. In the example of FIG. 5, each timestamp (column 520) is associated with a packet (e.g., a plurality) of reference signatures (column 530) that were captured during the timeframe of the timestamp. For example, the timestamps in column 520 may increment by 1 second and signatures may be captured every 16 milliseconds resulting in approximately 62 signatures for each timestamp value in column 520. Alternatively, a single signature may be associated with each timestamp, timestamps may be computed at a higher resolution (e.g., each millisecond), timestamps may be computed less frequently (e.g., every 2 seconds), etc. In the example of FIG. 5, the reference signatures (column 530) are characterized by 24-bit numbers in hexadecimal format characterizing the spectral energy distribution in defined frequency bands of a selected audio sample. According to the illustrated example, the signature values are not globally unique (e.g., signature 2F56AB is associated with Jan. 1, 2011 12:00:00 and Jul. 12, 2011 05:07:12). Accordingly, a sequence of signatures (e.g., signatures captured consecutively by a meter) is utilized to uniquely identify media. Alternatively, any other signature scheme may be employed (e.g., signatures may be globally unique).

Figure 6:
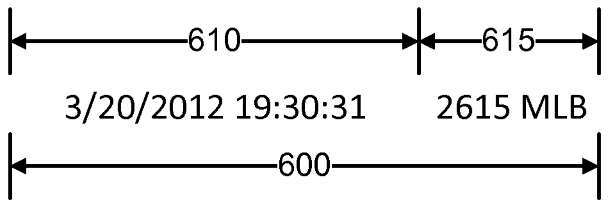
FIGS. 6-9 illustrate example identifying codes, which may be extracted by the code extractor of FIG. 3

An example identifying code 600 extracted by code extractor 310 and read by code approximator 410 is illustrated in FIG. 6. The example identifying code 600 includes a timestamp 610 and source identification data 615. The timestamp 610 of the identifying code 600, in this example, has been extracted without error and is, thus, complete. The source identification data 615 of the identifying code 600, in this example, has also been extracted without error.

Figure 7:
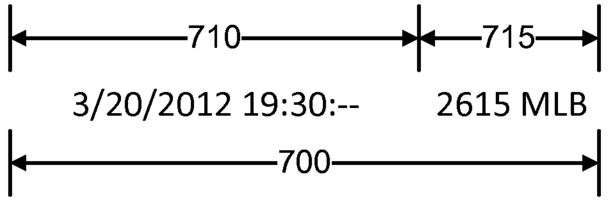

An example identifying code 700 extracted by code extractor 310 and read by code approximator 410 is illustrated in FIG. 7. The example identifying code 700 includes a timestamp 710 and source identification data 715. The timestamp 710 of the identifying code 700, in this example, was only partially readable. Accordingly, the seconds value in the timestamp 710 is unavailable. The source identification data 715 of the identifying code 700, in this example, has been extracted without error.

Figure 8:
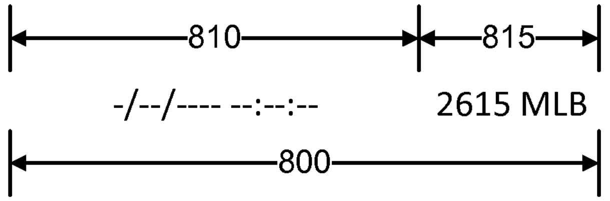

An example identifying code 800 extracted by code extractor 310 and read by code approximator 410 is illustrated in FIG. 8. The example identifying code 800 includes a timestamp 810 and source identification data 815. The timestamp 810 of the identifying code 800, in this example could not be read. The source identification data 815 of the identifying code 800, in this example, has been extracted without error.

Figure 9:
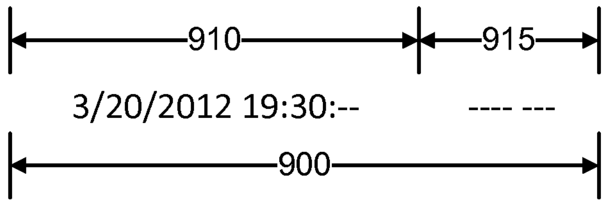

An example identifying code 900 extracted by code extractor 310 and read by code approximator 410 is illustrated in FIG. 9. The example identifying code 900 includes a timestamp 910 and source identification data 915. The timestamp 910 of the identifying code 900, in this example, was only partially readable. Accordingly, the seconds value in the timestamp 910 is unavailable. The source identification data 915 of the identifying code 900, in this example, was unreadable.

While an example manner of implementing the identification generator 110, the secondary media presentation device 130 and the secondary media manager 140 of FIG. 1 have been illustrated in FIGS. 2-4, one or more of the elements, processes and/or devices illustrated in FIGS. 2-4 may be combined, divided, re-arranged, omitted, eliminated and/or implemented in any other way. Further, the example code inserter 205, the example code generator 210, the example signature generator 215, the example clock 220, the example code extractor 310, the example signature generator 315, the example data packager 320, the example secondary media presenter 325, the example code approximator 410, the example signature reader 415, the example signature comparator 420, the example secondary media selector 425 and/or, more generally, the example identification generator 110, the example secondary media presentation device 130, and/or the secondary media manager 140 of FIGS. 1-4 may be implemented by hardware, software, firmware and/or any combination of hardware, software and/or firmware. Thus, the example code inserter 205, the example code generator 210, the example signature generator 215, the example clock 220, the example code extractor 310, the example signature generator 315, the example data packager 320, the example secondary media presenter 325, the example code approximator 410, the example signature reader 415, the example signature comparator 420, the example secondary media selector 425 and/or, more generally, the example identification generator 110, the example secondary media presentation device 130, and/or the secondary media manager 140 of FIGS. 1-4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example code inserter 205, the example code generator 210, the example signature generator 215, the example clock 220, the example code extractor 310, the example signature generator 315, the example data packager 320, the example secondary media presenter 325, the example code approximator 410, the example signature reader 415, the example signature comparator 420, the example secondary media selector 425 and/or, more generally, the example identification generator 110, the example secondary media presentation device 130, and/or the secondary media manager 140 are hereby expressly defined to include a tangible computer readable medium such as a memory, DVD, CD, Blu-ray, etc. storing the software and/or firmware. Further still, the example the identification generator 110, the secondary media presentation device 130 and the secondary media manager 140 of FIG. 1 have been illustrated in FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing, the example identification generator 110, the example secondary media presentation device 130, the example secondary media manager 140, the example media monitor 150, the example code approximator 410, the example signature reader 415, the example signature comparator 420, and the example secondary media selector 420 are shown in FIGS. 10-17. In these examples, the machine readable instructions comprise a program for execution by a processor such as the processor 1812 shown in the example processor platform 1800 discussed below in connection with FIG. 18. The program may be embodied in software stored on a tangible computer readable medium such as a CD-ROM, a floppy disk, a hard drive, a digital versatile disk (DVD), a Blu-ray disk, or a memory associated with the processor 1812, but the entire program and/or parts thereof could alternatively be executed by a device other than the processor 1812 and/or embodied in firmware or dedicated hardware. Further, although the example programs are described with reference to the flowcharts illustrated in FIGS. 10-17, many other methods of implementing, the example identification generator 110, the example secondary media presentation device 130, the example secondary media manager 140, the example media monitor 150, the example code approximator 410, the example signature reader 415, the example signature comparator 420, and the example secondary media selector 420 may alternatively be used. For example, the order of execution of the blocks may be changed, and/or some of the blocks described may be changed, eliminated, or combined.

As mentioned above, the example processes of FIGS. 10-17 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 10-17 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 10:
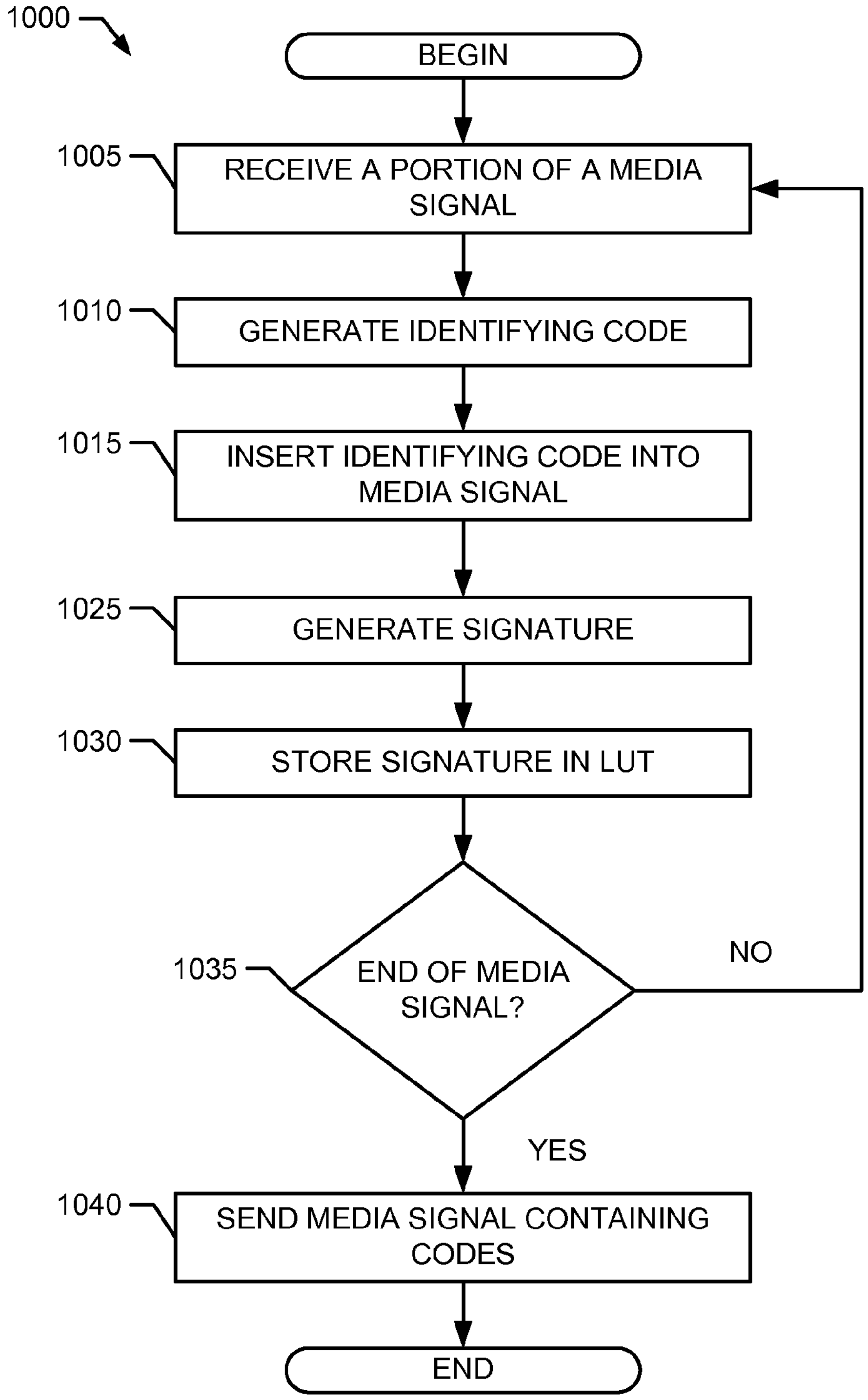
FIG. 10 is a flowchart representative of example machine readable instructions that may be executed to implement the example identification generator of FIGS. 1 and/or 2.

Example machine readable instructions 1000 that may be executed to implement the identification generator 110 of FIGS. 1 and 2 are illustrated in FIG. 10. With reference to FIGS. 1 and 2, the example machine readable instructions 1000 of FIG. 10 begin execution at block 1005 at which the identification generator 110 receives a portion of a media signal from the media provider(s) 105 (block 1005). The code generator 210 generates an identifying code for the portion of the media signal (block 1010). The code inserter 205 inserts the identifying code into the media signal (block 1015). The signature generator 215 generates a signature from the portion of the media signal (block 1025). The signature generator 215 stores the signature in the LUT 115 (block 1030). The signature generator 215 determines if the if the portion of the media signal is the end of the media signal (block 1035). If the portion of the media signal is the end of the media signal (e.g., no further media remains to be processed), the identification generator 110 sends the media signal containing codes to the media receiver 120 (block 1040). If there is additional media to be processed, control returns to block 1005. While FIG. 10 illustrates wherein an identifying code is inserted and a signature is generated in sequence, code insertion and signature generation may be performed by separate flows (e.g., at separate locations). Accordingly, the instructions illustrated by FIG. 10 may be performed in separate processes. For example, blocks 1005, 1010, 1015, 1035, and 1040 may be performed at a first location (e.g., at a media headend prior to media distribution) and blocks 1005, 1025, 1030, and 1035 may be performed at a second location (e.g., at a reference media monitoring site).

Figure 11:
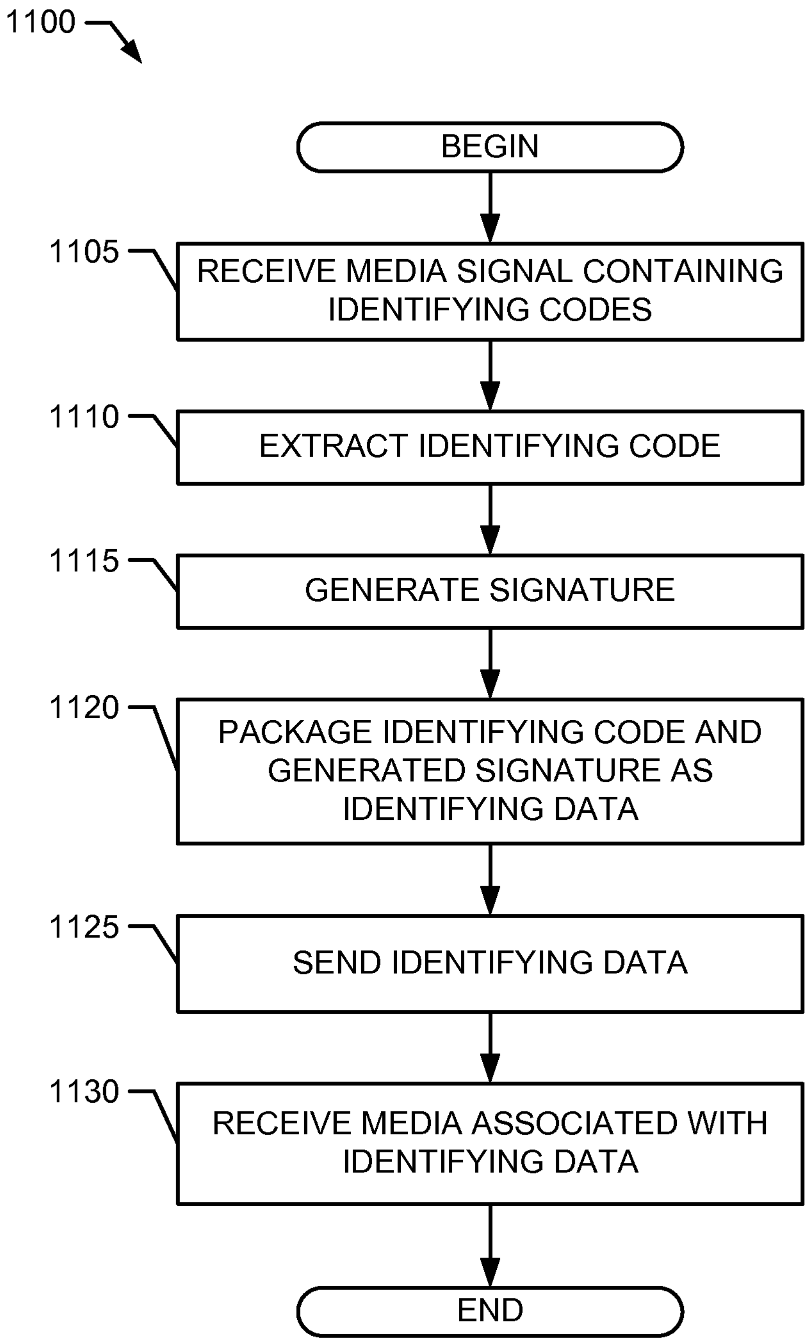
FIG. 11 is a flowchart representative of example machine readable instructions that may be executed to implement the example secondary media presentation device of FIGS. 1 and/or 3.

Example machine readable instructions 1100 that may be executed to implement the secondary media presentation device 130 of FIGS. 1 and 3 are illustrated in FIG. 11. With reference to FIGS. 1 and 3, the example machine readable instructions 1100 of FIG. 11 begin execution at block 1105 at which the secondary media presentation device 130 receives a media signal that includes identifying codes (block 1105). The code extractor 310 extracts an identifying code from the media signal that includes identifying codes (block 1110). The signature generator 315 generates a signature from the same media signal that includes the identifying codes (block 1115). The data packager 320 packages the extracted identifying code and the generated signature as identifying media monitoring information (block 1120). The secondary media presentation device 130 then sends the identifying media monitoring information to the secondary media manager 140 (block 1125). The secondary media presentation device receives media associated with the identifying data from the secondary media manager 140 (block 1130).

Figure 12:
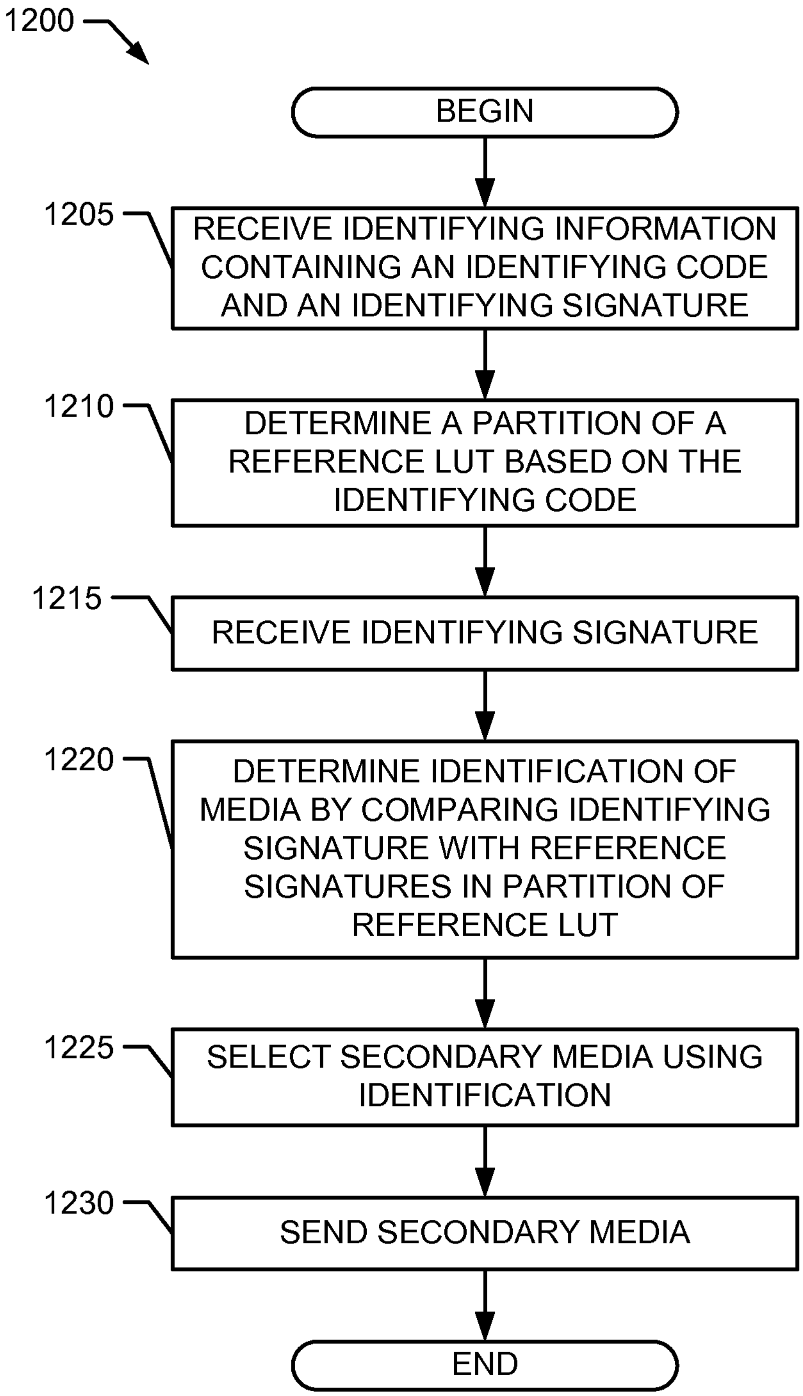
FIG. 12 is a flowchart representative of example machine readable instructions that may be executed to implement the example secondary media manager of FIGS. 1 and/or 4.

Example machine readable instructions 1200 that may be executed to implement the secondary media manager 140 of FIGS. 1 and 4 are illustrated in FIG. 12. With reference to FIGS. 1 and 4, the example machine readable instructions 1200 of FIG. 12 begin execution at block 1205 at which the secondary media presentation device receives identifying media monitoring information containing an identifying code and an identifying signature (block 1205). The code approximator 410 determines a partition of LUT 115 using the identifying code of the identifying media monitoring information (block 1210). The signature reader 415 receives an identifying signature from the identifying media monitoring information (block 1215). The signature comparator 420 determines matching media monitoring information by comparing the identifying signature with reference signatures in the partition of the LUT 115 (block 1220). The secondary media selector 425 selects secondary media using the matching media monitoring information (block 1225). The secondary media manager 140 sends the secondary media to the secondary media presentation device 130 via the network 160 (block 1230).

Figure 13:
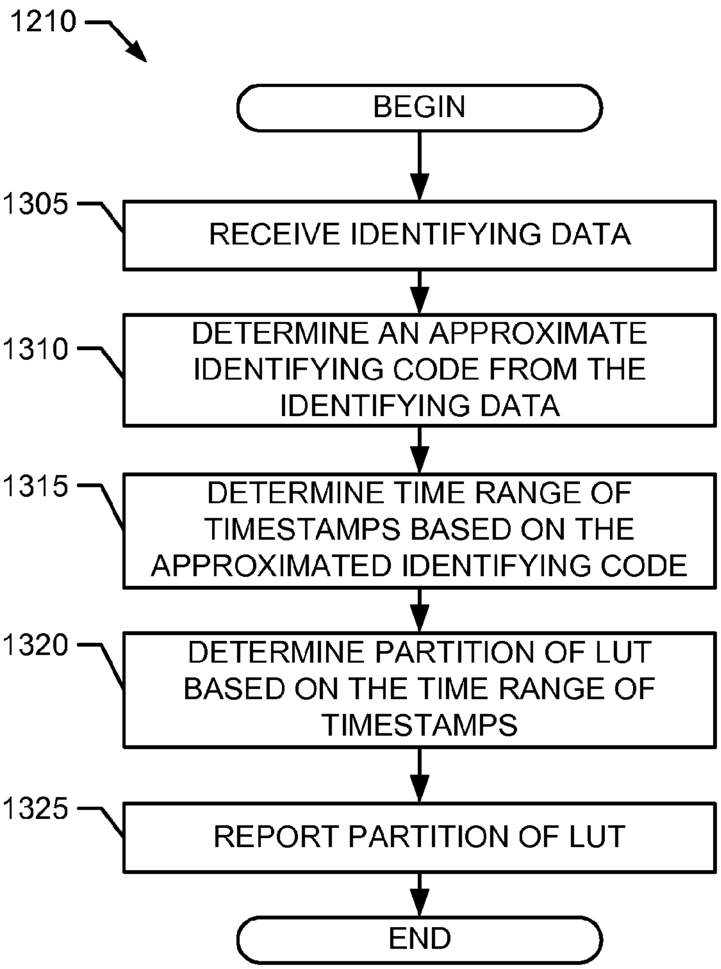
FIG. 13 is a flowchart representative of example machine readable instructions that may be executed to implement the example code approximator of FIG. 4.

Example machine readable instructions 1210 that may be executed to implement machine readable instructions of block 1210 of FIG. 12, which implements the code approximator 410 of FIG. 4, are illustrated in FIG. 13. With reference to FIG. 4, the example machine readable instructions 1300 of FIG. 13 begin execution at block 1305 at which the code approximator 410 receives an identifying code from the identifying media monitoring information (block 1305). The code approximator 410 determines an approximate identifying code from the received identifying code (block 1310). The code approximator 410 determines a time range of timestamps based on the approximate identifying code (block 1315). The code approximator 410 determines a partition of the LUT 115 wherein each entry in the partition of the LUT 115 includes a reference signature having a timestamp in the time range (block 1320). The code approximator 410 may utilize any filtering parameters to partition the LUT 115 such as, for example, all or part of the identifying code, a source identifier, the identified time range, and/or any other parameters for decreasing the search space of the LUT 115 to determine the partition of LUT 115. The code approximator reports the partition of the LUT 115 to the signature comparator 420 (block 1325).

Figure 14:
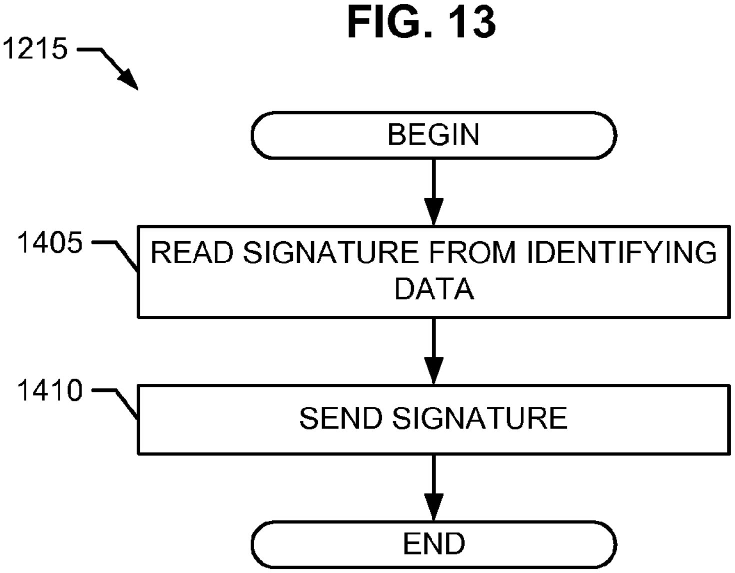
FIG. 14 is a flowchart representative of example machine readable instructions that may be executed to implement the example signature reader of FIG. 4.

Example machine readable instructions 1215 that may be executed to implement the machine readable instructions of block 1215 of FIG. 12, which implements the signature reader 415 of FIG. 4, are illustrated in FIG. 14. With reference to FIG. 4, the example machine readable instructions 1215 of FIG. 14 begin execution at block 1405 at which the signature reader 415 reads an identifying signature from the identifying media monitoring information (1405). The signature reader sends the read identifying signature to the signature comparator 420 (block 1410).

Figure 15:
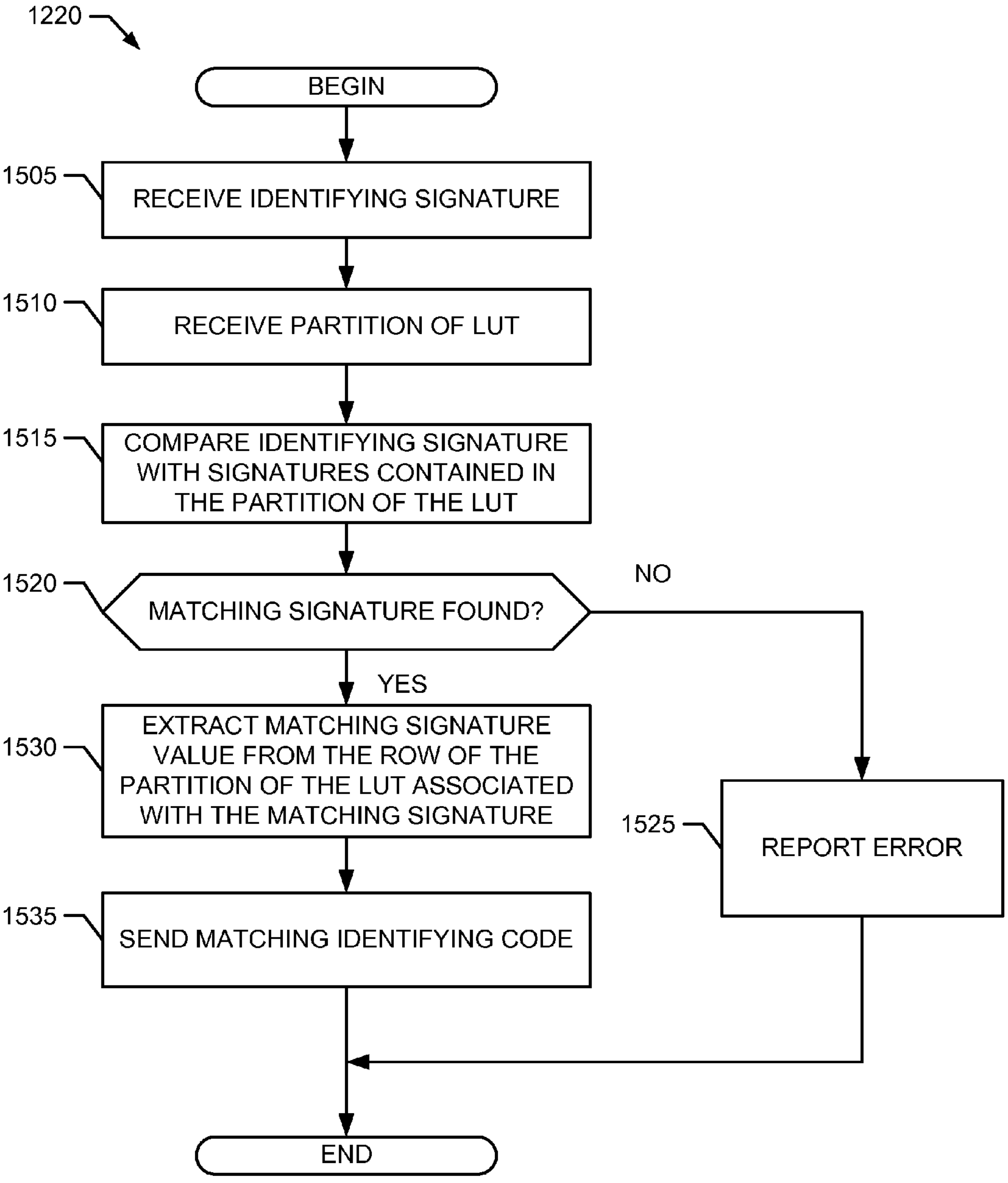
FIG. 15 is a flowchart representative of example machine readable instructions that may be executed to implement the example signature comparator of FIG. 4.

Example machine readable instructions 1220 that may be executed to further implement the machine readable instructions of block 1220 of FIG. 12, which implements the signature comparator 420 of FIG. 4, are illustrated in FIG. 15. With reference to FIG. 4, the example machine readable instructions 1500 of FIG. 15 begin execution at block 1505 at which the signature comparator 420 receives an identifying signature from the signature reader 415 (block 1505). The signature comparator 420 receives the partition of the LUT 115 from the code approximator 410 (block 1510). The signature comparator 420 compares the identifying signature with signatures contained in the partition of the LUT 115 (block 1515). If no matching signature is found, the signature comparator 420 reports an error (block 1525). If a matching signature is found (block 1520), the signature comparator 420 extracts the matching identifying information from the row of the partition of the LUT associated with the matching signature (block 1530). The signature comparator 420 sends the matching identifying information associated with the signature extracted from the LUT 115 to the secondary media selector 425 and the media monitor 150 as matching media monitoring information (block 1535).

Figure 16:
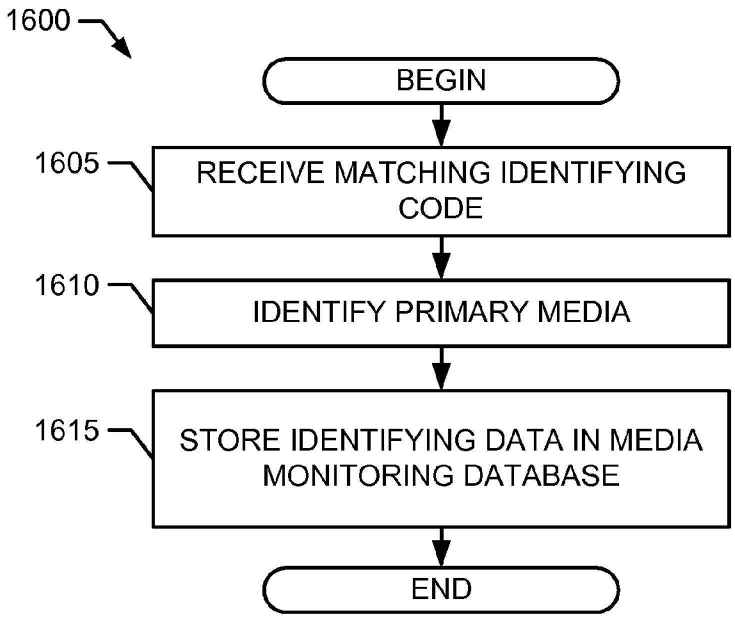
FIG. 16 is a flowchart representative of example machine readable instructions that may be executed to implement the media monitor of FIGS. 1 and/or 4.

Example machine readable instructions 1600 which may be executed to implement the media monitor 150 of FIGS. 1 and 4 are illustrated in FIG. 16. With reference to FIGS. 1 and 4, the example machine readable instructions 1600 of FIG. 16 begin execution at block 1605 at which the media monitor receives the matching media monitoring information from the signature comparator 420 (block 1605). The media monitor 150 identifies primary media using the matching media monitoring information (block 1610). The media monitor 150 stores matching media monitoring information in a media monitoring database 155 (block 1615).

Figure 17:
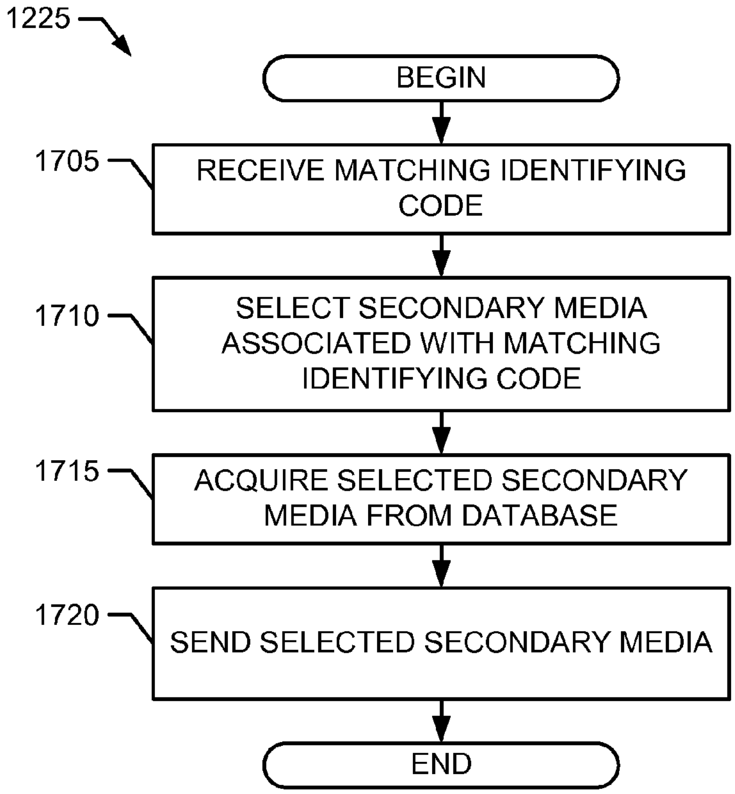
FIG. 17 is a flowchart representative of example machine readable instructions that may be executed to implement the secondary media selector of FIG. 4.

Example machine readable instructions 1225 which may be executed to implement the machine readable instructions of block 1225 of FIG. 12, which implements the secondary media selector 425 of FIG. 4, are illustrated in FIG. 17. With reference to FIG. 4, the example machine readable instructions 1700 of FIG. 17 begin execution at block 1705 at which the secondary media selector receives the matching media monitoring information from the signature comparator 420 (block 1705). The secondary media selector 425 selects secondary media associated with the matching media monitoring information (block 1710). The secondary media selector 425 acquires the selected secondary media from a secondary media database 430 (block 1715). The secondary media selector 425 sends the secondary media to the secondary media presentation device 130 (block 1720).

Figure 18:
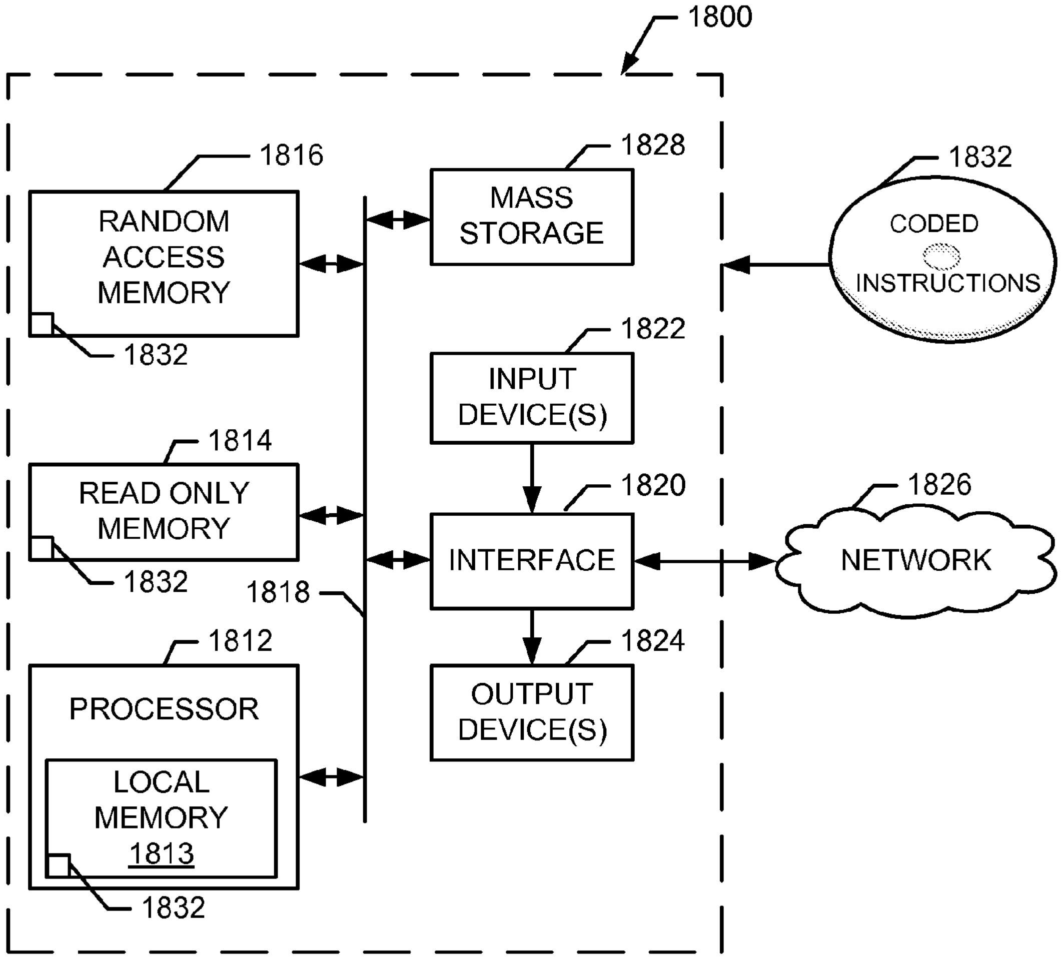
FIG. 18 is a block diagram of an example processing system that may execute the example machine readable instructions of FIGS. 10-17, to implement the example identification generator of FIGS. 1 and/or 2, the example secondary media presentation device of FIGS. 1 and/or 3, the example secondary media manager of FIGS. 1 and/or 4, the example code approximator of FIG. 4, the example signature reader of FIG. 4, the example signature comparator of FIG. 4, the example media monitor of FIGS. 1 and/or 4, and/or the example secondary media selector of FIG. 4.

FIG. 18 is a block diagram of an example processor platform 1800 capable of executing the instructions of FIGS. 10-17 to implement the apparatus of FIGS. 1-4. The processor platform 1800 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 1800 of the instant example includes a processor 1812. For example, the processor 1812 can be implemented by one or more microprocessors or controllers from any desired family or manufacturer.

The processor 1812 includes a local memory 1813 (e.g., a cache) and is in communication with a main memory including a volatile memory 1816 and a non-volatile memory 1814 via a bus 1818. The volatile memory 1816 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1814 may be implemented by flash memory and/or any other desired type of memory device. Access to the main memory 1814, 1816 is controlled by a memory controller.

The processor platform 1800 also includes an interface circuit 1820. The interface circuit 1820 may be implemented by any type of interface standard, such as an Ethernet interface, a universal serial bus (USB), and/or a PCI express interface.

One or more input devices 1822 are connected to the interface circuit 1820. The input device(s) 1822 permit a user to enter data and commands into the processor 1812. The input device(s) can be implemented by, for example, a keyboard, a mouse, a touchscreen, a track-pad, a trackball, isopoint and/or a voice recognition system.

One or more output devices 1824 are also connected to the interface circuit 1820. The output devices 1824 can be implemented, for example, by display devices (e.g., a liquid crystal display, a cathode ray tube display (CRT), a printer and/or speakers). The interface circuit 1820, thus, typically includes a graphics driver card.

The interface circuit 1820 also includes a communication device (e.g., communication device 56) such as a modem or network interface card to facilitate exchange of data with external computers via a network 1826 (e.g., an Ethernet connection, a digital subscriber line (DSL), a telephone line, coaxial cable, a cellular telephone system, etc.).

The processor platform 1800 also includes one or more mass storage devices 1828 for storing software and data. Examples of such mass storage devices 1828 include floppy disk drives, hard drive disks, compact disk drives and digital versatile disk (DVD) drives. The mass storage device 1828 may implement the example media provider(s) 105, the example LUT 115, the example media monitoring database 155, and/or the example secondary media database 430.

The coded instructions 1832 of FIGS. 10-17 may be stored in the mass storage device 1828, in the volatile memory 1814, in the non-volatile memory 1816, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:

determining, by executing an instruction with a processor, an identifying timestamp that is unreadable or otherwise unavailable, the identifying timestamp associated with an identifying code obtained from a media signal;

determining, by executing an instruction with the processor, an approximate time from the identifying timestamp;

determining, by executing an instruction with the processor, a time range based on the approximate time; and identifying, by executing an instruction with the processor, entries of a look-up table for inclusion in a partition of the look-up table, the entries including timestamps in the time range;

constructing, by executing an instruction with the processor, based on the entries, the partition of the look-up table including respective reference signatures;

comparing, by executing an instruction with the processor, a signature extracted from the media signal to the reference signatures in the partition of the look-up table; and identifying, by executing an instruction with the processor, media associated with the media signal based on the comparing.

2. The method as defined in claim 1, wherein identifying the media includes matching a sequence of signatures extracted from the media signal to reference signatures.

3. The method as defined in claim 1, wherein the look-up table contains:

timestamps; and signatures from a reference media signal wherein the signatures are associated with the timestamps.

4. The method as defined in claim 1, wherein the partition of the look-up table is determined by decreasing a search space of the look-up table.

5. The method as defined in claim 1, further including synchronizing a media presentation device with the media signal using the identity of the media.

6. A method comprising:

determining a portion of an identifying code from a media signal, the portion of the identifying code including an identifying timestamp that is unreadable or otherwise unavailable;

determining an approximate timestamp from the identifying timestamp;

determining a time range based on the approximate timestamp;

identifying entries of a look-up table for inclusion in a partition of the look-up table, the entries including timestamps in the time range, the partition of the look-up table including reference signatures associated with the portion of the identifying code; and identifying the media signal by comparing a signature extracted from the media signal to reference signatures in the partition of the look-up table.

7. The method as defined in claim 1, wherein the identifying code is source identification data.

8. The method as defined in claim 7, wherein the entries include the source identification data.

9. The method as defined in claim 6, wherein the portion of the identifying code contains source identification data and the entries include the source identification data.

10. The method as defined in claim 1, wherein the media signal contains an audio signal.

11. The method as defined in claim 10, wherein the identifying code is determined from an audio watermark.

12. The method as defined in claim 1, wherein the look-up table is stored on at least one of a database, a hard disk, a storage facility, or a removable media storage device.

13. The method as defined in claim 1, wherein determining a partition of the look-up table is performed by:

determining filtering parameters for the partition based on the identifying code; and executing the filtering parameters to populate the partition.

14. The method as defined in claim 1, wherein a sequence of signatures are extracted from the media signal, wherein the sequence of signatures matches at least two instances of media presentation in the look-up table, and wherein the sequence of signatures matches one instance of the media presentation in the partition of the look-up table.

15. A system for identifying media, the system comprising:

a code extractor to determine an identifying timestamp that is unreadable or otherwise unavailable, the identifying timestamp associated with an identifying code from a media signal;

an interface to:

determine an approximate time from the identifying timestamp;

determine a time range based on the approximate time; and identify entries of a look-up table for inclusion in a partition of the look-up table, the entries including timestamps in the time range;

construct based on the entries, the partition of the look-up table including respective reference signatures; and a media identifier to compare a signature extracted from the media signal to the reference signatures in the partition of the look-up table and identify media associated with the media signal based on the comparison.

16. The system as defined in claim 15, wherein the media identifier is to identify the media by matching a sequence of signatures extracted from the media signal to reference signatures.

17. The system as defined in claim 15, wherein the look-up table contains:

timestamps; and signatures from a reference media signal wherein the signatures are associated with the timestamps.

18. The system as defined in claim 15, further including a media manager to synchronize a media presentation device with the media signal using the identity of the media.

19. The system as defined in claim 15, wherein the partition of the look-up table is determined by decreasing a search space of the look-up table.

20. A system for identifying media, the system comprising:

a code extractor to determine a portion of an identifying code from a media signal, the portion of the identifying code containing an identifying timestamp, a portion of the identifying timestamp being unreadable or otherwise unavailable;

an interface to:

determine an approximate timestamp from the identifying timestamp, determine a time range based on the approximate timestamp, and identify entries of a look-up table for inclusion in a partition of the look-up table, the entries including timestamps in the time range, the partition of the look-up table including reference signatures associated with the portion of the identifying code; and a media identifier to identify the media signal by comparing a signature extracted from the media signal to reference signatures in the partition of the look-up table.

21. The system as defined in claim 15, wherein the identifying code is source identification data.

22. The system as defined in claim 21, wherein the entries include the source identification data.

23. The system as defined in claim 20, wherein the portion of the identifying code contains source identification data and the entries include the source identification data.

24. The system as defined in claim 15, wherein the media signal contains an audio signal.

25. The system as defined in claim 24, wherein the identifying code is determined from an audio watermark.

26. The system as defined in claim 15, wherein the look-up table is stored on at least one of a database, a hard disk, a storage facility, or a removable media storage device.

27. The system as defined in claim 15, wherein determining the partition of the look-up table is performed by:

determining filtering parameters for the partition based on the identifying code; and executing the filtering parameters to populate the partition.

28. The system as defined in claim 15, wherein a sequence of signatures are extracted from the media signal, wherein the sequence of signatures matches at least two instances of media presentation in the look-up table, and wherein the sequence of signatures matches one instance of the media presentation in the partition of the look-up table.

29. A non-transitory computer readable medium comprising machine readable instructions, which, when executed, cause a machine to at least:

determine, by executing an instruction with a processor, an identifying timestamp that is unreadable or otherwise unavailable, the identifying timestamp associated with an identifying code obtained from a media signal;

determine, by executing an instruction with the processor, an approximate time from the identifying timestamp;

determine, by executing an instruction with the processor, a time range based on the approximate time; and identify, by executing an instruction with the processor, entries of a look-up table for inclusion in a partition of the look-up table, the entries including timestamps in the time range;

construct, by executing an instruction with the processor, based on the entries, the partition of the look-up table including respective reference signatures;

compare, with the processor, a signature extracted from the media signal to the reference signatures in the partition of the look-up table; and identify, by executing an instruction with the processor, media associated with the media signal based on the comparison.

30. A computer readable medium as defined in claim 29, wherein the instructions, when executed, cause the machine to identify the media by matching a sequence of signatures extracted from the media signal to reference signatures.

31. A computer readable medium as defined in claim 29, wherein the look-up table contains:

timestamps; and signatures from a reference media signal wherein the signatures are associated with the timestamps.

32. A computer readable storage medium as defined in claim 29, wherein the machine readable instructions further cause the machine to synchronize a media presentation device with the media signal using a determined identity of the media.

33. A computer readable medium as defined in claim 29, wherein the partition of the look-up table is determined by decreasing a search space of the look-up table.

34. A non-transitory computer readable medium comprising instructions, which, when executed cause a machine to at least:

determine a portion of an identifying code from a media signal, the portion of the identifying code including an identifying timestamp that is unreadable or otherwise unavailable;

determine an approximate timestamp from the identifying timestamp;

determine a time range based on the approximate timestamp; and identify entries of a look-up table for inclusion in a partition of the look-up table, the entries including timestamps in the time range, the partition of the look-up table including reference signatures associated with the portion of the identifying code; and identify the media signal by comparing a signature extracted from the media signal to reference signatures in the partition of the look-up table.

35. A computer readable medium as defined in claim 29, wherein the identifying code is source identification data.

36. A computer readable medium as defined in claim 35, wherein the entries include the source identification data.

37. A computer readable medium as defined in claim 34, wherein the portion of the identifying code contains source identification data and the entries include the source identification data.

38. A computer readable medium as defined in claim 29, wherein the media signal contains an audio signal.

39. A computer readable medium as defined in claim 38, wherein the identifying code is determined from an audio watermark.

40. A computer readable medium as defined in claim 29, wherein the look-up table is stored on at least one of a database, a hard disk, a storage facility, or a removable media storage device.

41. A computer readable medium as defined in claim 29, wherein determining the partition of the look-up table is performed by:

determining filtering parameters for the partition based on the identifying code; and executing the filtering parameters to populate the partition.

42. A computer readable medium as defined in claim 29, wherein a sequence of signatures are extracted from the media signal, wherein the sequence of signatures matches at least two instances of media presentation in the look-up table, and wherein the sequence of signatures matches one instance of the media presentation in the partition of the look-up table.

* * * * *

UNITED STATES PATENT AND TRADEMARK OFFICE

CERTIFICATE OF CORRECTION

PATENT NO. : 9,286,912 B2
APPLICATION NO. : 13/627495
DATED : March 15, 2016
INVENTOR(S) : Venugopal Srinivasan and Alexander Topchy It is certified that error appears in the above-identified patent and that said Letters Patent is hereby corrected as shown below:

Claims

In Column 19, line 33 (Claim 15): Insert --obtained-- between "code" and "from"

Signed and Sealed this
Seventeenth Day of May, 2016

Michelle K. Lee

Michelle K. Lee
*Director of the United States Patent and Trademark Office*

UNITED STATES PATENT AND TRADEMARK OFFICE
CERTIFICATE OF CORRECTION

PATENT NO. : 9,286,912 B2
APPLICATION NO. : 13/627495
DATED : March 15, 2016
INVENTOR(S) : Venugopal Srinivasan and Alexander Topchy It is certified that error appears in the above-identified patent and that said Letters Patent is hereby corrected as shown below:

Claims
Column 21, line 8 (Claim 32): Delete the word “storage” between “readable” and “medium”.

Signed and Sealed this
Fifth Day of July, 2016

Michelle K. Lee
*Director of the United States Patent and Trademark Office*